(12) United States Patent
Spoeler

(10) Patent No.: US 7,168,556 B2
(45) Date of Patent: Jan. 30, 2007

(54) CURVED ASSEMBLY LINE AND/OR CONVEYOR BELT

(75) Inventor: Hans-Gerd Spoeler, Borken (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/560,799

(22) PCT Filed: Jun. 24, 2004

(86) PCT No.: PCT/EP2004/006854

§ 371 (c)(1),
(2), (4) Date: Dec. 15, 2005

(87) PCT Pub. No.: WO2005/005234

PCT Pub. Date: Jan. 20, 2005

(65) Prior Publication Data

US 2006/0157320 A1   Jul. 20, 2006

(30) Foreign Application Priority Data

Jul. 14, 2003   (DE) .................. 103 31 886

(51) Int. Cl.
*B65G 15/02* (2006.01)
(52) U.S. Cl. .............. 198/831; 198/465.2; 198/850
(58) Field of Classification Search ............. 198/831, 198/850, 851, 853, 580, 465.1
See application file for complete search history.

(56) References Cited

U.S. PATENT DOCUMENTS

| | | | | |
|---|---|---|---|---|
| 1,973,750 A | * | 9/1934 | De Kay | ............... 186/49 |
| 2,689,638 A | * | 9/1954 | Mojonnier | ............... 198/831 |
| 2,848,102 A | * | 8/1958 | Whitney | ............... 198/793 |
| 3,290,058 A | | 12/1966 | Ellerd | |
| 5,201,407 A | * | 4/1993 | Proske | ............... 198/833 |

FOREIGN PATENT DOCUMENTS

| | | |
|---|---|---|
| DE | 603 291 | 9/1934 |
| DE | 42 40 989 | 6/1994 |
| DE | 198 58 989 | 6/2000 |

OTHER PUBLICATIONS

International Search Report from International Application No. PCT/EP2004/006854, dated Sep. 20, 2004.

\* cited by examiner

*Primary Examiner*—Gene O. Crawford
*Assistant Examiner*—Kavel Singh
(74) *Attorney, Agent, or Firm*—Van Dyke, Gardner, Linn & Burkhart, LLP

(57) ABSTRACT

The invention relates to a curved assembly line and/or conveyor belt, especially for assembling and transporting motor vehicles or motor vehicle parts during production, said line or belt being formed by articulated carrier elements that positively engage in each other and respectively comprise an upper platform and a lower carrier frame and have convex and concave front surfaces with identical curvature radii. The aim of the invention is to enable an essentially tangential orientation of the platforms in the curved region with a simple course of displacement and low control costs. To this end, respective carrier elements (2) with concave (9) and convex front surfaces (6,7) on both sides alternate in the longitudinal direction of the assembly line and/or conveyor belt (1), and the respective carrier elements (2) with concave front surfaces (9) on both sides are embodied as short intermediate elements (8) which are located between the carrier elements (2) receiving the load and have convex front surfaces (6,7) on both sides.

21 Claims, 3 Drawing Sheets

CURVED ASSEMBLY LINE AND/OR CONVEYOR BELT

BACKGROUND OF THE INVENTION

The invention relates to a curved assembly line and/or conveyor belt, in particular for the assembly and transport of motor vehicles or motor vehicle parts in production, which is formed by carrying elements which are mounted in an articulated manner with respect to one another and engage positively one into the other and which have in each case an upper platform and a lower carrying frame and the end faces of which are convexly and concavely curved in the form of an arc of a circle with approximately identical radii of curvature, so that in each case a convex and a concave recess of two adjacent carrying elements form, bearing positively one against the other, a continuous conveyor belt transition both in curved sections and on a straight line.

Assembly lines and/or conveyor belts serve, in automobile production, for reception of automobile parts, in particular bodies, in the execution of assembly work and for other production and transport work. The automobile workers working on the automobile parts normally move along with the slowly moving conveyor belt and can move freely on the platform. The individual carrying elements of these assembly lines and/or conveyor belts have wheels or are carried on roller strips. The drive takes place mostly via driven roller batteries which transmit the drive force to the carrying elements by frictional connection. The drive stations are usually arranged at the commencement of a straight conveying section.

Force transmission from carrying element to carrying element takes place on straight conveying sections by means of pushing forces, and at the ends of the conveying sections the carrying elements are braked via a braking station, in order to avoid gaps in the composite pushing structure. Downstream of the braking station, the draw-off stations are usually arranged, which execute a "staggered drawing" of the carrying elements, in order to allow a cross transfer or a vertical transfer, for example by means of a lifter. The rotational movement of the carrying elements usually describes a rectangle. However, other layouts are possible.

The known assembly lines and/or conveyor belts of the type described have various disadvantages. If, for example, the direction of travel of the carrying elements is maintained after the cross transfer, then a 180-degree rotation of the carrying elements is required. The corner transfer necessary for this purpose is a blocked region; that is to say, it is not available for assembly work on the automobile and, furthermore, without a high outlay in terms of protection, constitutes a high risk potential. Corner transfer itself requires a complex sequence of movement with high outlay in control terms, and also the power supply of the platforms presents problems on account of the corner transfer.

Curved carrying elements are also known (DE-A-198 58 989), which, rotating in a closed circuit, form the assembly line and/or conveyor belt, a semicircular curve with a normally constant curve radius following a straight conveying section on both sides. In order to avoid gaps and rifts between the adjacent carrying elements, particularly in the curved sections, the carrying elements have in each case a concave and a convex end face, in each case with an identical radius and center point. The carrying elements can also be operated in an open composite structure. There, too, the drive takes place via stationary roller batteries or via co-moving individual drives.

These curved carrying elements have the disadvantage that, because of the polygon effect of the elongated carrying elements, wide covers which close the rifts between the adjacent carrying elements are required in the curved sections, with the result that the useful area available on the platform in the curve is reduced considerably.

The result of this is that, below a particular curve radius, sometimes the standing area for, for example, an automobile or a body becomes too narrow. In curves with a low ratio of curve radius to length of carrying elements, a considerable polygon effect arises, which, particularly in a closed circuit, leads to a permanent change in the length of rotation. These length changes have to be compensated by means of structural measures; a tangential orientation of the platforms in the arc is not possible in this prior art.

SUMMARY OF THE INVENTION

The object of the present invention is to provide a curved assembly line and/or conveyor belt of the generic type, which, along with a simple movement sequence and low outlay in control terms, makes it possible, by virtue of its design, to have an essentially tangential orientation of the platforms in the arc region, so that, on account of narrow stationary covers of the assembly line and/or conveyor belt, a larger useful area is available on the platform in the curved region.

To achieve the object, it is proposed, according to the invention, to alternate with one another in the longitudinal direction of the assembly line and/or conveyor belt in each case carrying elements with end faces concave on both sides and with end faces convex on both sides, and in each case to design the carrying elements with end faces concave on both sides as short intermediate elements between the load-receiving carrying elements with end faces convex on both sides.

In order to avoid gaps between the platforms and the disadvantages described with regard to the prior art, the carrying elements are configured and assembled into the assembly line and/or conveyor belt in such a way that, in each case alternately, one carrying element has two convex end faces and the second adjacent carrying element, the intermediate element, as it is referred to, has two concave end faces.

By virtue of this proposal, the polygon effect during the deflection of the platforms in the curved sections is markedly reduced, but the orientation of the platforms with respect to the direction of travel is maintained, so that the corner transfer required hitherto may be dispensed with.

All the carrying elements together with their attached platforms are mechanically connected fixedly to one another, that is to say there is no risk that, for example due to a malfunction of the control, a gap between two adjacent platforms occurs, which could lead to persons being put at risk.

Owing to the use of the short intermediate elements which allow an essentially tangential orientation of the carrying elements together with their platforms in the arc region of the conveying path, it is possible for assembly work to be carried out even in the arc because of the high space utilization. Barriers or other safety measures extending beyond the stationary covers in the curves are not required.

The kinematics according to the invention also make it possible to employ long carrying elements for the reception of large payloads and long articles, for example long automobiles. The modular construction of the conveyor belt and assembly line according to the invention makes it possible to change the stroke interval simply by exchanging the intermediate elements, without the carrying element together with the main platform itself having to be changed. The plant can be operated, overall, with a low polygon effect.

A multiplicity of carrying elements may be joined together via connecting members into a closed or open composite platform structure. A closed composite platform structure leads to a carousel-like rotation of the carrying elements on a path closed on itself.

The connecting members of the carrying elements may be coupling rods, in each case two adjacent carrying elements separated by a common intermediate piece and having convex end faces being connected to one another in an articulated manner by means of a common coupling rod, in such a way that the two articulation points of each coupling rod lie in each case on the radius center points of those end faces of the carrying elements which are curved concavely in the form of an arc of a circle.

The selected kinematics and the configuration of the carrying elements ensure that the end faces of the carrying elements roll against one another, without giving rise to gaps between the platforms. The carrying elements move around the curve in a tangential orientation with respect to the curve curvature. Owing to the mechanical connection of the carrying elements, secure connection takes place even in the curved sections, without constraints in the system arising.

Roller guides or sliding guides, which allow a friction-free or low-friction displacement of the adjacent carrying elements with respect to one another, may be provided on the end face in those regions of the carrying elements which face one another.

The drive of the carrying elements of the invention may take place in a way known per se by means of a plurality of friction-wheel stations distributed along the travel of the carrying elements. According to another proposal of the invention, however, it is also possible that the drive of the assembly line and/or conveyor belt takes place via individual drives which are assigned to at least every nth carrying element and which are arranged, co-moving, on the corresponding carrying element.

In the case of electric drives, according to another feature of the invention, the energy and/or data supply of the carrying elements takes place permanently via contact lines which are laid next to or below the carrying elements along the travel.

Within the scope of the invention, it is also conceivable that the energy and/or data supply takes place permanently or inductively in sections. As a result, disturbing lines are avoided and transitions are simplified.

According to a further feature of the invention, there is provision for the guidance of at least every second carrying element to take place via guide rails laid on the ground.

As is known in other undercarriages, in order to achieve lateral tilt stability, according to the invention, the distance between two guide rails laid as a double track with a spacing between them is reduced in the curved region. As a result, constraints on the undercarriages due to thermal effects and due to the polygon effect during passage through curves are avoided, particularly when the inner of the two guide rails is designed both as a carrying and as a guide rail.

In most instances, it is expedient if the carrying elements rotating in a closed composite platform structure are guided on an oval (stadium-shaped) path of rotation. In such an instance, the complicated corner transfers and the cross connection sections which are employed in the prior art and cannot be used for assembly purposes are dispensed with. Instead, because of the advantageous kinematics of the carrying elements according to the invention, assembly is possible even in the curved regions, and the plant capacity can be fully utilized owing to the larger available useful area on the platform.

According to a further refinement of the invention, the lateral guidance of the carrying elements takes place at outer and/or inner carrying rails. In this case, a specific guidance of the intermediate elements is not required, because, due to the coupling to the adjacent carrying elements guided on the guide rails, the intermediate elements are taken up in a freely guided manner. Spacing takes place via the coupling rods.

As a refinement, active or passive lifting devices, which serve as an assembly aid, may be installed in at least individual carrying elements. These lifting devices can, when controlled, for example, by slotted link, make it possible separately to raise or lower each individual wheel of the four wheels of an automobile. Also, other expedient fittings, such as, for example, suction-extraction devices, may also be carried on the platforms of the carrying elements.

So that even a change in level of the plane of rotation can be executed by means of the carrying elements according to the invention, according to another feature of the invention, vertical arcs are provided in the carrying and/or guide rails, and the carrying elements are additionally connected to one another via horizontal joints.

Finally, there is provision for the carrying elements designed as an intermediate element to be configured so as to be easily removable for inspection and/or maintenance purposes.

Vertical load transmission may take place via co-moving steel rollers on the underside of the carrying elements, such as with the carrying rollers being mounted rotatably about their vertical axes. In the case of a low rolling resistance of the metallic carrying rollers, a low-slung type of construction requiring no pit is obtained. The platform itself is advantageously formed by a plywood layer which can be walked on by persons and, for vehicle removal, can be driven on.

The invention has a multiplicity of advantages which include: The invention is simple in construction and has high functional reliability. Owing to the tangential orientation of the carrying elements in the curves, narrow covers can be implemented, which allow a large interspacing even in the arc. This makes it easier to install lifting devices controlled by slotted link, active lifting tables, suction-extraction systems, etc. The carrying elements together with the platforms can be operated in a closed or open composite structure. The drive takes place via stationary roller batteries or via co-moving individual drives. No intermediate covers are required between the platforms of the carrying elements. The orientation of the platforms with respect to the direction of travel is always maintained, and there is no need for any corner transfer. The movement sequence is simple and requires only a low outlay in control terms. Since all the platforms are mechanically connected fixedly to one another, there is no risk that, for example due to a malfunction of the control, a gap between two adjacent platforms occurs, which could lead to persons being put at risk. The uniform drives make a closed contact line for energy and data transmission possible.

The invention makes it possible for assembly work to be carried out even in the arc of the curved region, thus resulting in a high space utilization, because there is no need for any barriers or other safety measures which extend beyond stationary (flat) covers which, even in the arc, leave open large fractions of the useful area of the main platforms.

By virtue of the measures of the invention, the carrying elements and consequently the main platforms can be made larger, and make it possible to receive large payloads, for example long automobiles, and further fittings, such as suction-extraction systems, etc.

The stroke interval of the assembly line and/or conveyor belt can be varied by adapting the intermediate element, without the main platform having to be changed. Finally, the use of metallic carrying rollers with low rolling resistances allows a low-slung type of construction, so that no pit is required. The cover of the intermediate elements can easily be removed for maintenance and repair purposes.

BRIEF DESCRIPTION OF THE DRAWINGS

An exemplary embodiment of the invention is illustrated in the drawing and is described below. In the drawing.

DETAILED DESCRIPTION OF THE PREFERRED EMBODIMENT

Figure 2:
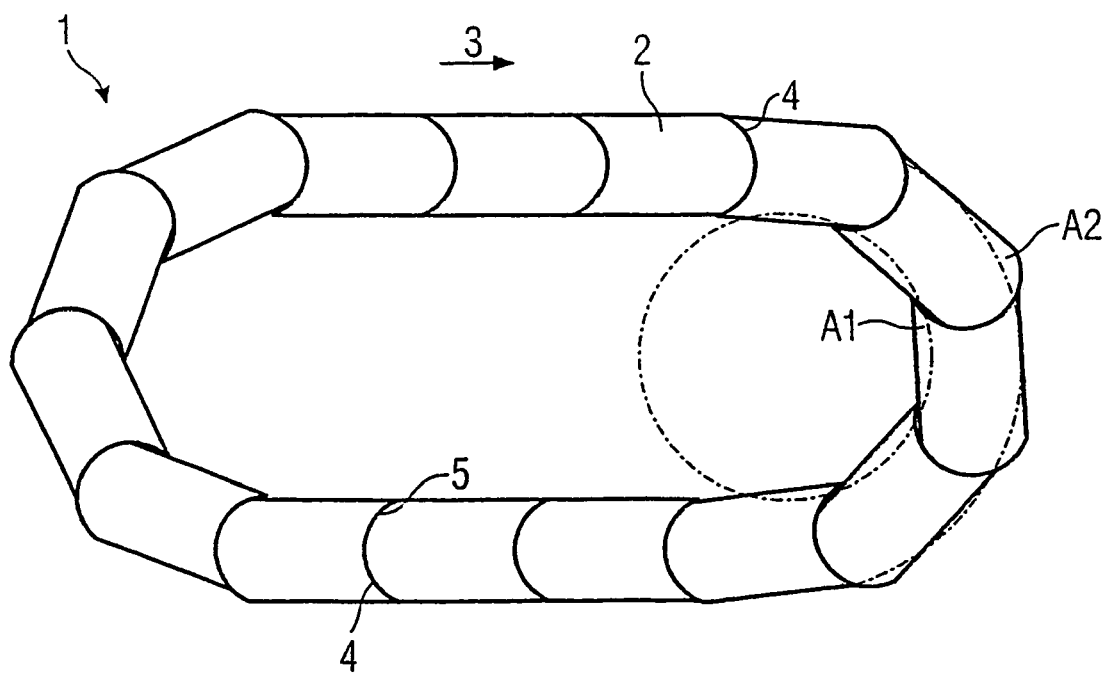
FIG. 2 shows an assembly line and/or conveyor belt according to the prior art.

The drawing FIG. 2 illustrates, roughly diagrammatically, an assembly line and/or conveyor belt 1, such as is known and described in the prior art. The assembly line and/or conveyor belt is used in the automobile industry for the assembly and transport of motor vehicles and consists of carrying elements 2 which are mounted in an articulated manner with respect to one another and engage positively one into the other and which are guided on an endless conveying section. The individual carrying elements 2 are in each case designed convexly on their end faces 4 leading in the conveying direction 3 and concavely on their opposite end faces 5, so that, when the carrying elements 2 rotate, the leading end faces 4 of the one carrying element 2 engage positively in the trailing end faces 5 of the carrying element 2 adjacent to the conveying direction 3, in such a way that a continuous transition between the adjacent carrying elements 2 is afforded both in the curved region and on the straight conveying section. As can be seen in FIG. 2, the carrying elements 2 move around the curve in a polygonal progression, the carrying elements 2 coupled to one another moving, in regions, laterally out of the curved profile which resembles an arc of a circle.

If it is considered that the carrying elements 2, slowly moved along as much as possible at the same level as the ground, are to be walked upon safely by the workers and, if appropriate, the finished vehicles are also to be driven down off them from the platform, it becomes clear that measures must be taken in the curved region in order to prevent both laterally and on the end faces of the carrying elements gaps which threaten to put at risk workers working there. For this reason, those side regions of the carrying elements 2 which are formed and resemble a polygonal progression are spanned in the curved region by covers A1 and A2 which cover the gaps occurring due to the polygonal progression.

The more pronounced is the polygonal effect during deflection around the curve or the more narrowly the curve is deflected, the more widely the covers A1 and A2 required must span the carrying elements 2. The result of this is that the work platform remaining between the outer A2 and the inner A1 covers is markedly narrower in the curved region than in the region where the parking elements run in a straight line. In an extreme case, the platform for a vehicle or a body placed on it may be too narrow, so that assembly in the curved region becomes impossible.

Figure 1:
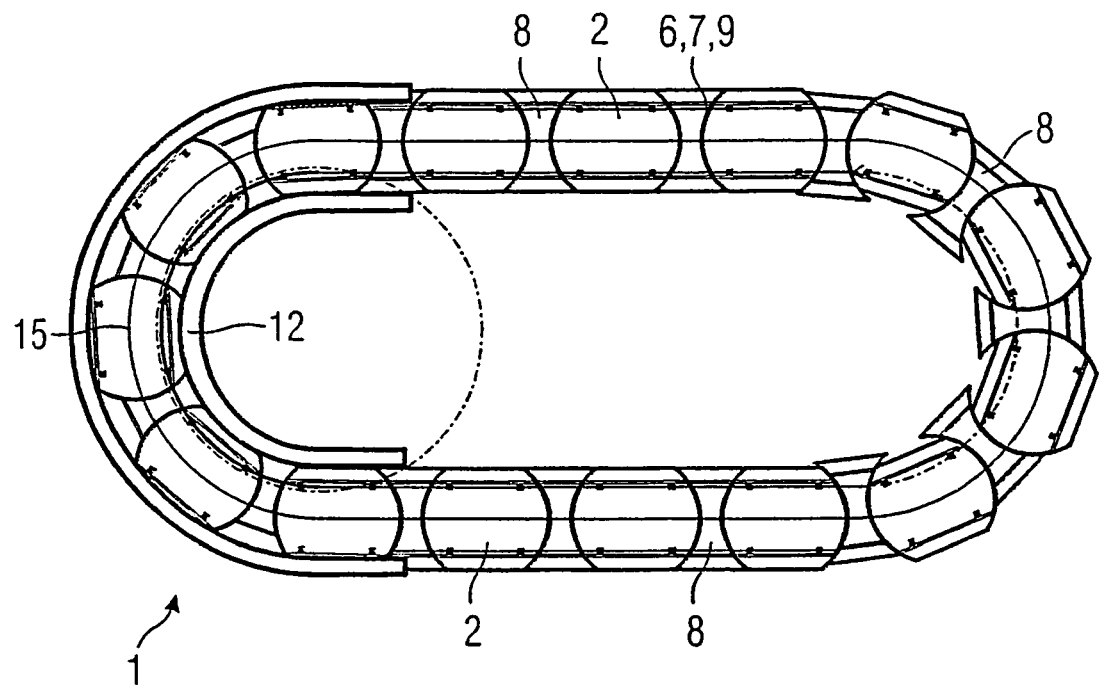
FIG. 1 shows the assembly line and/or conveyor belt according to the invention for the assembly and/or transport of a motor vehicle.

The drawing FIG. 1 illustrates, roughly diagrammatically, how the problem is solved by means of the invention. According to the invention, the carrying elements 2 of the assembly line and/or conveyor belt 1 are designed convexly on both end faces 6, that is to say the end faces directed both in the conveying direction and opposite to the conveying direction, the same curvatures corresponding in each case to the segment of a circle. The carrying element adjacent in each case, as an intermediate element 8, is designed to be shorter than the carrying element 2 and has on its two end faces concave recesses 9 which face the end faces 6 of the carrying elements 2 and which, like the end faces of the carrying elements 2, are formed in each case from circle segments having identical radii.

Figure 3:
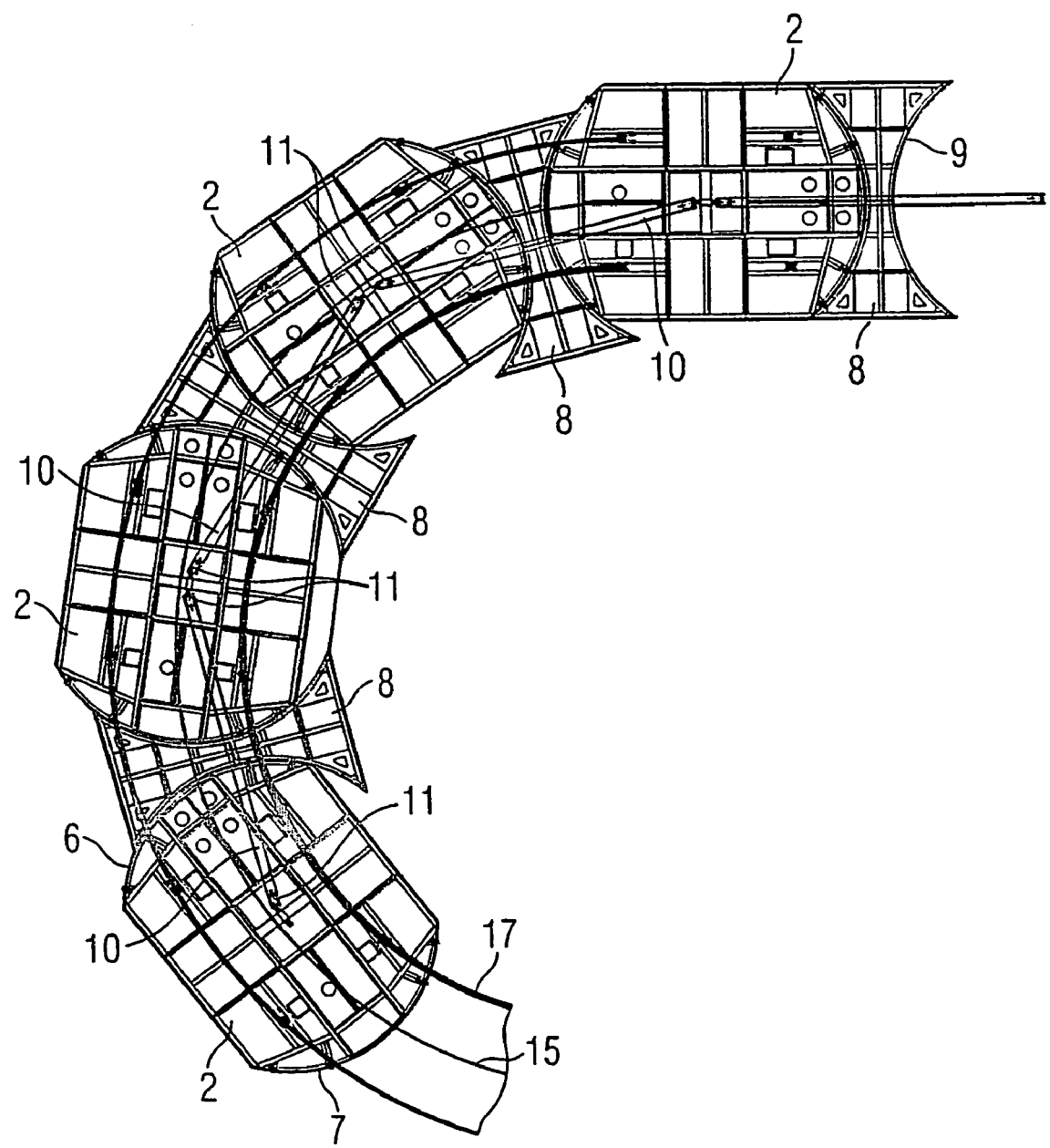
FIG. 3 shows an enlarged illustration of the curved region of an assembly line and/or conveyor belt according to the invention.

As can be seen in the enlarged illustration of a curved profile of an assembly line and/or conveyor belt according to the invention in FIG. 3, the intermediate elements 8 have fastened to them central coupling rods 10 which extend symmetrically on both sides of the intermediate elements 8, to which they are fastened, into the region of the carrying elements 2, where the coupling rods 10 are articulated at 11. The articulation point 11 of the coupling rods 10 is arranged at the radius center point both of the end faces 6 and 7 of the carrying elements 2 and of the convex or concave end faces 6 and 9 of the intermediate elements 8, so that the end faces, for example 6 and 9, of a carrying element 2 and of an intermediate element 8 roll one on the other, positively guided by the coupling rod 10, when the carrying elements 2 and intermediate pieces 8 move in the curved region. The coupling rods 10, which are provided on each intermediate element 8 and are connected in each case to the two adjacent carrying elements 2, have the effect that, in an assembly line and/or conveyor belt of the invention, a substantially finer polygonal division is brought about, and, above all, that the carrying elements 2 always move tangentially with respect to the curved path 15 of the assembly line and/or conveyor belt 1. Due to this effect, the present invention requires only narrow covers, such as can be seen in the drawing FIG. 1 at 12. As a result, the useful platform region of the carrying elements 2 which is available for assembly or for transport is substantially larger than is the case in the prior art according to FIG. 2. This enlarged work region on the platforms makes it possible for transport and assembly to continue, unimpeded, even in the curved region of the assembly line and/or conveyor belt according to the invention, so that the capacity and availability of the carrying elements are markedly increased.

In the drawing FIG. 4, the frame of the carrying element 2 and the carrying rollers 13, provided below the carrying element 2 and rolling on the ground, can also be seen in the view of a carrying element 2 from below. Furthermore, the convex end faces 6 and 7 of the carrying element 2 and, overall, the struts and frame parts allowing high load reception can be seen.

Figure 4:
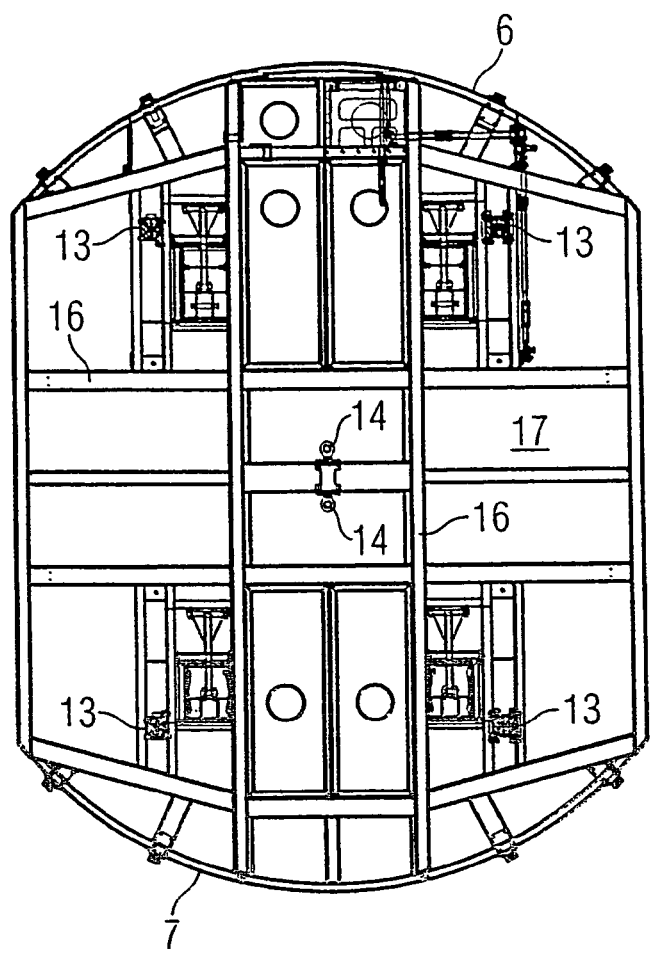
FIG. 4 shows the frame of a carrying element according to the invention.
Figure 5:
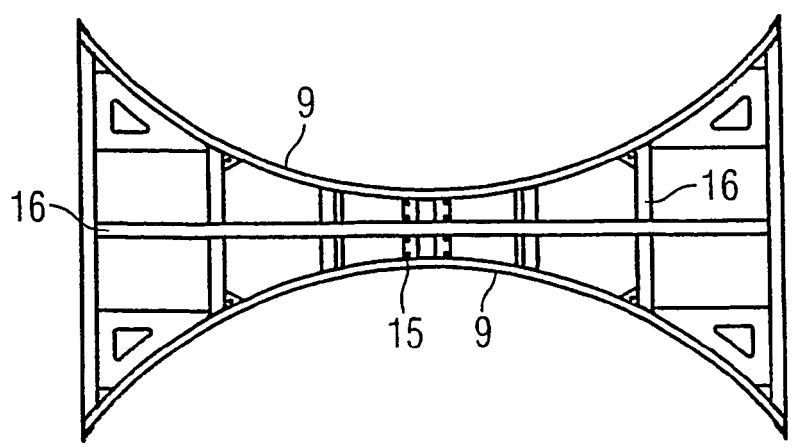
FIG. 5 shows a carrying element according to the invention designed as an intermediate element.

FIG. 5 illustrates, isolated, one of the intermediate elements 8; the coupling rod 10, which is not illustrated in FIGS. 4 and 5, on the one hand, is articulated on the carrying element 2 at 14 and, on the other hand, is secured centrally at the fastening points 15 of the intermediate piece 8 in such a way that an articulated connection of two carrying elements 2 in each case to an intermediate piece 8 arranged between them becomes possible.

The frame 16 of the carrying elements 2 or of the intermediate elements 8 is covered on the top side by the platform 17 which consists preferably of wood. The undercarriages with the rollers 13 are, if appropriate, at least partially driven. Both conventional individual drives, which are arranged, co-moving, on the carrying elements, and the known friction-wheel drives, which engage on the carrying elements 2 on the outside and move these via pushing forces, come into consideration.

The invention claimed is:

1. A curved assembly line and/or conveyor belt for the assembly and transport of motor vehicles or motor vehicle parts in production, comprising:
    carrying elements which are mounted in an articulated manner with respect to one another and engage positively one into the other and which have an upper platform and a lower carrying frame and the end faces of which are convexly and concavely curved in the form of an arc of a circle with approximately identical radii of curvature, so that in each case a convex and a concave recess of two adjacent carrying elements form, bearing positively one against the other, a continuous conveyor belt transition both in curved sections and on a straight line;
    ones of said carrying elements being intermediate carrying elements with concave end faces that are concave on both sides and others of said carrying elements being load-receiving carrying elements with convex end faces that are convex on both sides, wherein said intermediate carrying elements and said load-receiving carrying elements alternate with one another in a longitudinal direction of the assembly line and/or conveyor belt, and said intermediate carrying elements are short intermediate elements between said load-receiving carrying elements.

2. The curved assembly line and/or conveyor belt as claimed in claim 1, wherein a multiplicity of said carrying elements are joined together via connecting members into a closed or open composite platform structure.

3. The curved assembly line and/or conveyor belt as claimed in claim 2, wherein said connecting members of said carrying elements are coupling rods, wherein two adjacent ones of said load-receiving carrying elements separated by a common one of said intermediate carrying elements are connected to one another in an articulated manner by a common one of said coupling rods, wherein two articulation points of each of said coupling rods lying on radius center points of said concave and convex end faces.

4. The curved assembly line and/or conveyor belt as claimed in claim 3, including roller guides or sliding guides on the end face in those regions of the load-receiving and intermediate carrying elements which face one another.

5. The curved assembly line and/or conveyor belt as claimed in claim 4, including a drive for said assembly line and/or conveyor belt, said drive comprising a plurality of friction-wheel stations distributed along the travel of said load-receiving and intermediate carrying elements.

6. The curved assembly line and/or conveyor belt as claimed in claim 4, including a drive for the assembly line and/or conveyor belt, said drive comprising individual drives which are assigned to at least every nth one of said load-receiving carrying elements and which are arranged, co-moving, on the corresponding one of said load-receiving carrying elements.

7. The curved assembly line and/or conveyor belt as claimed in claim 1 including contact lines to supply energy and/or data supply to the carrying elements.

8. The curved assembly line and/or conveyor belt as claimed in claim 1 including a supply of energy and/or data supply, said supply being permanently or inductively in sections.

9. The curved assembly line and/or conveyor belt as claimed in claim 1, including guidance of at least every second load-receiving carrying element via at least one guide rail laid on the ground.

10. The curved assembly line and/or conveyor belt as claimed in claim 9, wherein said at least one guide rail comprises one chosen from a single guide rail and a pair of guide rails and wherein the distance between said pair of guide rails laid with a spacing between them is reduced in the curved region and wherein said single guide rail is designed with a small width in the curve.

11. The curved assembly line and/or conveyor belt as claimed in claim 9 wherein said load-receiving intermediate carrying elements are guided on an oval path of rotation with two straight conveying sections and with semicircular curves connecting said straight conveying sections on both sides.

12. The curved assembly line and/or conveyor belt as claimed in claim 9, wherein lateral guidance of said load-receiving carrying elements takes place at outer and/or inner carrying rails.

13. The curved assembly line and/or conveyor belt as claimed in claim 12, wherein said intermediate elements rotate, unguided.

14. The curved assembly line and/or conveyor belt as claimed in claim 1 including active or passive lifting devices that are installed in at least individual ones of said load-receiving carrying elements.

15. The curved assembly line and/or conveyor belt as claimed in claim 1, wherein said intermediate carrying elements are configured to be easily removable for inspection and/or maintenance purposes.

16. The curved assembly line and/or conveyor belt as claimed in claim 1, wherein vertical load transmission takes place via co-moving steel rollers, said steel rollers being mounted rotatably about a vertical axis.

17. The curved assembly line and/or conveyor belt as claimed in claim 1, wherein two adjacent ones of said load-receiving carrying elements separated by a common one of said intermediate carrying elements are connected to one another in an articulated manner by a common coupling rod, wherein two articulation points of said coupling rod lying on radius center points of said concave and convex end faces.

18. The curved assembly line and/or conveyor belt as claimed in claim 1, including roller guides or sliding guides on the end face in those regions of the load-receiving and intermediate carrying elements which face one another.

19. The curved assembly line and/or conveyor belt as claimed in claim 18 including vertical arcs that are provided in the at least one guide rail for changing the level of the plane of rotation, and wherein said load-receiving and intermediate carrying elements are additionally connected to one another via horizontal joints.

20. The curved assembly line and/or conveyor belt as claimed in claim 1, including a drive for said assembly line and/or conveyor belt, said drive comprising a plurality of friction-wheel stations distributed along the travel of said load-receiving and intermediate carrying elements.

21. The curved assembly line and/or conveyor belt as claimed in claim 1, including a drive for the assembly line and/or conveyor belt, said drive comprising individual drives which are assigned to at least every nth one of said load-receiving carrying elements and which are arranged, co-moving, on the corresponding one of said load-receiving carrying elements.

\* \* \* \* \*